United States Patent
Bonn et al.

(10) Patent No.: US 10,484,381 B1
(45) Date of Patent: Nov. 19, 2019

(54) WIRELESS PRIORITY SERVICE (WPS) AUTHORIZATION

(71) Applicant: Sprint Communications Company L.P., Overland Park, KS (US)

(72) Inventors: Mark J. Bonn, Granite Bay, CA (US); Abdolreza Asghari, Santa Clara, CA (US); Dominick Mangiardi, Fremont, CA (US); James D. Kirby, San Mateo, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 176 days.

(21) Appl. No.: 15/659,121

(22) Filed: Jul. 25, 2017

(51) Int. Cl.
*H04L 29/06* (2006.01)
*H04W 12/08* (2009.01)

(52) U.S. Cl.
CPC .......... *H04L 63/10* (2013.01); *H04L 65/1006* (2013.01); *H04L 65/1016* (2013.01); *H04L 65/403* (2013.01); *H04W 12/08* (2013.01)

(58) Field of Classification Search
CPC .. H04L 63/10; H04L 65/1006; H04L 65/1016
USPC .......................................................... 726/4
See application file for complete search history.

(56) References Cited

U.S. PATENT DOCUMENTS

| | | | |
|---|---|---|---|
| 8,085,783 B2 | 12/2011 | Zhou et al. | |
| 8,543,107 B1 | 9/2013 | Bertz et al. | |
| 8,681,709 B2 | 3/2014 | Sennett et al. | |
| 8,688,129 B2 | 4/2014 | Gogic | |
| 8,761,351 B1 | 6/2014 | Daly et al. | |
| 9,173,138 B2 | 10/2015 | Agiwal et al. | |
| 2002/0122396 A1 | 9/2002 | Terasawa | |
| 2006/0068761 A1 | 3/2006 | Chambers et al. | |
| 2006/0242300 A1* | 10/2006 | Yumoto | H04L 29/06027 709/226 |
| 2007/0127494 A1* | 6/2007 | Carter | H04L 12/2801 370/395.21 |
| 2008/0225835 A1* | 9/2008 | Oda | H04L 45/00 370/352 |
| 2008/0267376 A1* | 10/2008 | Khasnabish | H04M 3/367 379/201.01 |
| 2009/0075665 A1* | 3/2009 | Gogic | H04L 47/805 455/446 |

(Continued)

OTHER PUBLICATIONS

U.S. Appl. No. 15/396,465, filed Dec. 31, 2016.

(Continued)

*Primary Examiner* — Anthony D Brown (57) ABSTRACT

A wireless data communication network authorizes Wireless Priority Service (WPS) communications. A Session Initiation Protocol (SIP) server transfers a WPS authorization code to a WPS communication device. The WPS communication device transfers a WPS SIP message to a SIP server. The WPS SIP message has the WPS authorization code and a WPS session request. The SIP server authorizes the WPS SIP message based on the WPS authorization code. When the WPS SIP message is authorized, the SIP server system identifies network addressing based on the WPS session request. The SIP server system transfers a response message to the WPS communication device that identifies the network addressing. The WPS communication device wirelessly transfers WPS data over the WPS session using the network addressing.

18 Claims, 8 Drawing Sheets

(56) References Cited

U.S. PATENT DOCUMENTS

2009/0109932 A1     4/2009   Maheshwari et al.
2010/0135205 A1     6/2010   Li et al.
2015/0358853 A1    12/2015   Kiss

OTHER PUBLICATIONS

U.S. Appl. No. 15/437,261, filed Feb. 20, 2017.
U.S. Appl. No. 15/621,823, filed Jun. 13, 2017.
U.S. Appl. No. 15/626,888, filed Jun. 19, 2017.

\* cited by examiner

WIRELESS PRIORITY SERVICE (WPS) AUTHORIZATION

TECHNICAL BACKGROUND

Data communication systems exchange user data for user communication devices to provide various data communication services. The user communication devices may be phones, computers, headsets, machines, or some other user device. The data communication services might be media conferencing, gaming, social networking, machine communications, and the like. To extend the range of these data communication services, the data communication systems deploy wireless data networks that communicate over the air with wireless user communication devices. Current Fourth Generation (4G) wireless data networks are being augmented with Fifth Generation 5G wireless data networks.

Wireless Priority Service (WPS) is a federally-administered program that enables emergency personnel to communicate over wireless networks—especially during periods of intense network congestion. These wireless networks host Internet Protocol Multimedia Subsystem (IMS) servers, WPS application servers, and WPS subscriber databases to serve WPS data communications.

To initiate a WPS voice call, the WPS user inputs *272 and then the called number into their phone. The wireless user device sends a Session Initiation Protocol (SIP) INVITE message that has *272+ called number in the "TO" field. An IMS functional element recognizes the *272 dialing prefix and handles the call with a WPS quality-of-service. A WPS application server uses the WPS subscriber database to authorize the WPS user before the WPS quality-of-service is delivered.

Unfortunately, WPS communications require the *272 dialing prefix even though some smartphones do not support the * symbol through their exposed telephony Application Programming Interfaces (APIs). WPS authorization is not efficient and effective in the current 4G/5G wireless communication environment.

Technical Overview

A wireless data communication network authorizes Wireless Priority Service (WPS) communications. A Session Initiation Protocol (SIP) server transfers a WPS authorization code to a WPS communication device. The WPS communication device transfers a WPS SIP message to a SIP server. The WPS SIP message has the WPS authorization code and a WPS session request. The SIP server authorizes the WPS SIP message based on the WPS authorization code. When the WPS SIP message is authorized, the SIP server system identifies network addressing based on the WPS session request. The SIP server system transfers a response message to the WPS communication device that identifies the network addressing. The WPS communication device wirelessly transfers WPS data over the WPS session using the network addressing.

DETAILED DESCRIPTION

Figure 1:
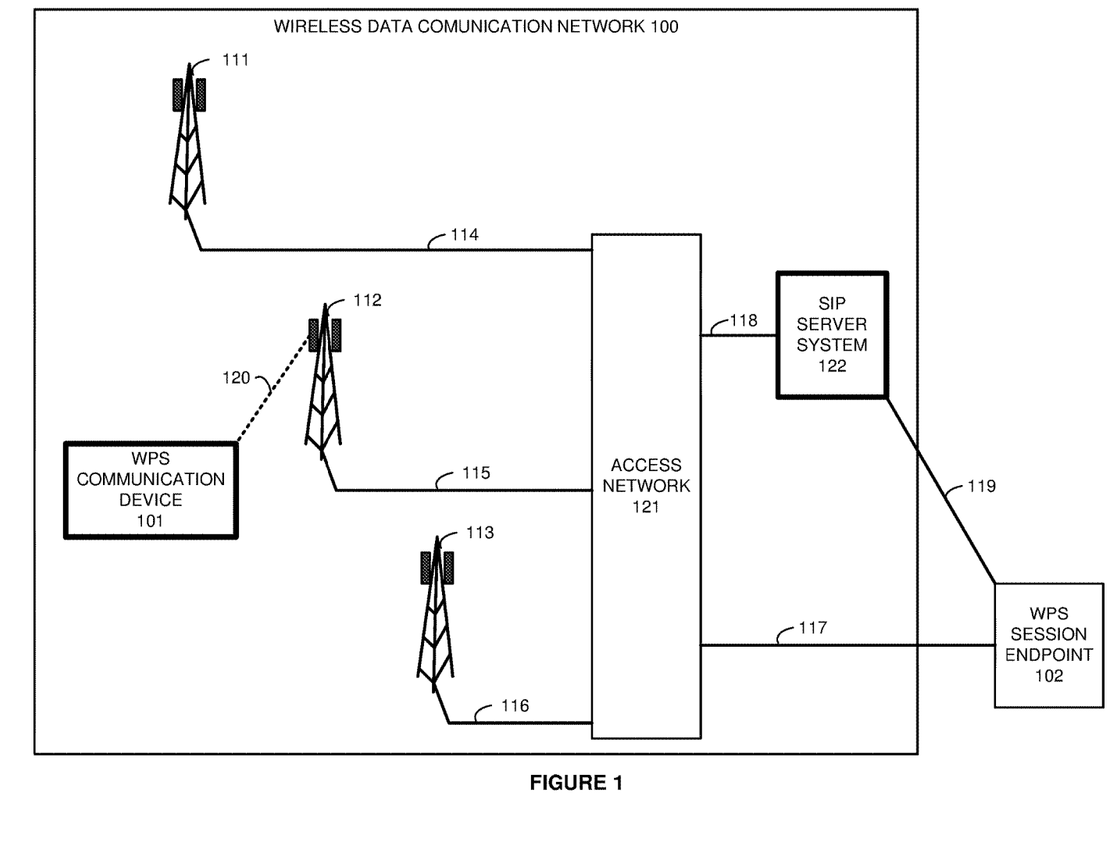
FIGS. 1-2 illustrate a wireless data communication network to serve Wireless Priority Service (WPS) communications using authorization codes.
Figure 2:
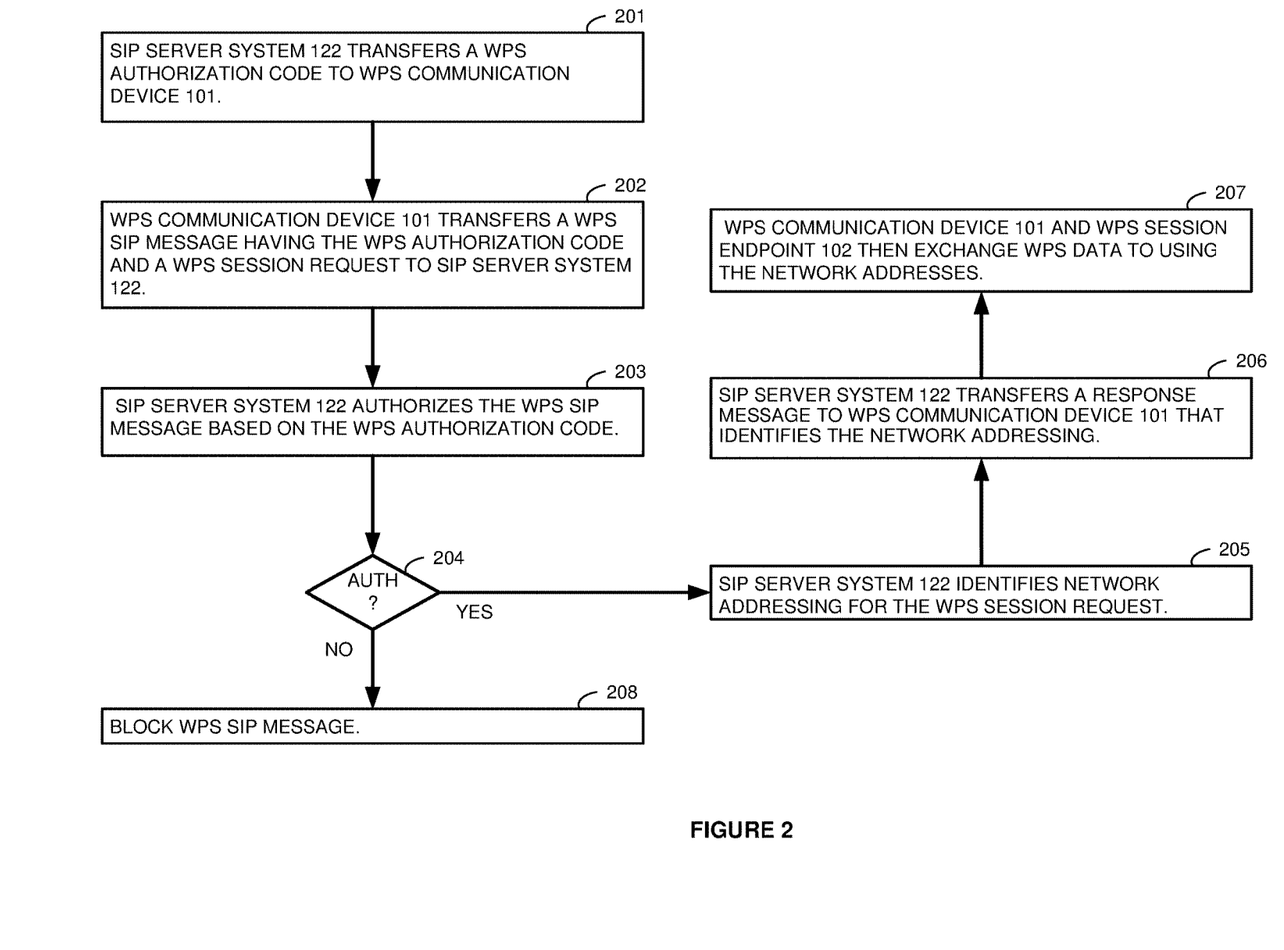

FIGS. 1-2 illustrate wireless data communication network 100 to serve Wireless Priority Service (WPS) communications using WPS authorization codes. Referring to FIG. 1, wireless data communication network 100 comprises WPS communication device 101, wireless base stations 111-113, network data links 114-120, access network 121, and Session Initiation Protocol (SIP) server system 122.

WPS communication device 101 is made of computer hardware like Central Processing Units (CPUs), Random Access Memory (RAM), persistent data storage, bus interfaces, and data transceivers. WPS communication device 101 also has computer software like an operating system, network signaling, user applications, and the like. WPS communication device 101 uses communication protocols like Institute of Electrical and Electronic Engineers (IEEE) 802.11, Long-Term Evolution (LTE), Fifth Generation (5G) wireless, Internet Protocol (IP), and Session Initiation Protocol (SIP). WPS communication device 101 may comprise a computer, phone, headset, and/or some other type of WPS transceiver. WPS communication device 101 uses WPS authorization codes to access SIP server system 122 and communicate with SIP session endpoint 102.

Wireless base stations 111-113 comprise wireless access points, hotspots, relays, or some other type of wireless transceivers. Wireless base stations 111-113 are made of computer hardware like antennas, filters, amplifiers, Digital Signal Processors (DSPs), CPUs, RAM, persistent data storage, bus interfaces, and data transceivers. Wireless base stations 111-113 also have computer software like operating systems, user signaling, network signaling, data processing, and the like. Wireless base stations 111-113 use communication protocols like IEEE 802.11, LTE, 5G wireless, IEEE 802.3, IP, Time Division Multiplex (TDM), Wavelength Division Multiplex (WDM), and Data Over Cable System Interface Specification (DOCSIS). Wireless base stations 111-113 may comprise LTE evolved Node Bs.

Access network 121 comprise gateways, controllers, databases, and associated network elements. Access network 121 is made of computer hardware like CPUs, RAM, persistent data storage, bus interfaces, and data transceivers. Access network 121 also has computer software like operating systems, user signaling, network signaling, data processing, user authorization, mobility control, policy enforcement, and the like. Access network 121 uses communication protocols like LTE, 5G wireless, IEEE 802.3, IP, and Diameter. Access network 121 may comprise an LTE core computer system.

SIP server system 122 is made of computer hardware like CPUs, RAM, persistent data storage, bus interfaces, and data transceivers. SIP server system 122 also has computer software like operating systems, user signaling, network signaling, data processing, database, and the like. SIP server system 122 uses communication protocols like IEEE 802.3, IP, SIP, and Diameter. SIP server system 122 may comprise an Internet Protocol Multimedia Subsystem (IMS). SIP server system 122 transfers WPS authorization codes to WPS communication device 101. SIP server system 122 authorizes the WPS authorization codes when WPS communication device 101 inserts the WPS codes in SIP signaling that initiates WPS data sessions.

Network data links 114-120 exchange user data and network signaling. Network data links 114-119 use metal, glass, air/space, plastic or some other signal conductor. Network data links 114-119 use communication protocols like IEEE 802.11, LTE, 5G wireless, IEEE 802.3, IP, TDM, WDM, and DOCSIS. Network data link 120 is wireless and uses communication protocols like IEEE 802.11, LTE, or 5G wireless.

WPS session endpoint 102 is shown outside of wireless data communication network 100, but endpoint 102 could be within network 100. WPS session endpoint 102 could be similar to WPS communication device 101, however, WPS session endpoint 102 might also be a network server, enterprise database, content delivery network, industrial machine, or the like.

To authorize WPS data communications, SIP server system 122 transfers a WPS authorization code to WPS communication device 101. The WPS authorization code traverses access network 121, wireless base station 112, and data links 115, 118, and 120. The WPS authorization code could be a six-digit code or some other suitable data string. The WPS authorization code may indicate or be associated with a Time-To-Live (TTL). The WPS authorization code may also indicate or be associated with a Quality-of Service (QoS) level. Note that the WPS authorization code is not the usual *272 dialing prefix.

WPS communication device 101 transfers a WPS SIP message to SIP server system 122. The WPS SIP message traverses access network 121, wireless base station 112, and data links 115, 118, 120. The WPS SIP message has the WPS authorization code and a WPS session request. The WPS session request indicates WPS session endpoint 102 and might be for a voice conference, video conference, data message delivery, or some other data communication service. The WPS SIP message does not contain the *272 dialing prefix.

SIP server system 122 authorizes the WPS SIP message based on the WPS authorization code. SIP server system 122 typically performs the authorization by comparing the authorization code received from WPS communication device 101 to a stored-version of the authorization code that it previously transferred to WPS communication device 101. SIP server system 122 may also check a TTL metric to deny authorization to stale authorization codes. SIP server system 122 denies WPS service or takes some other investigative action if the WPS SIP message cannot be authorized.

If the WPS SIP message is authorized, then SIP server system 122 identifies network addressing based on the WPS session request. The network addressing could be an IP address, Uniform Resource Indicator (URI), and the like. The process may entail the exchange of SIP signaling with other SIP servers. SIP server system 122 transfers a response message that identifies the network addressing to WPS communication device 101. The response message traverses access network 121, wireless base station 112, and data links 115, 118, and 120. WPS communication device 101 and WPS session endpoint 102 then use the network addressing to exchange WPS data over access network 121, wireless base station 112, and data links 115, 117, and 120.

To enhance WPS communications, SIP server system 122 selects a QoS level based on the authorization code and/or the identity of wireless communication device 101. For example, SIP server system 122 may add a WPS Resource Priority Header (RPH) to the WPS SIP message after authorization, and the WPS RPH may include the selected QoS level (such as ets.0 or ets.1) in the emergency namespace. Access network 121, wireless base station 112, and data links 115, 117, and 120 exchange the WPS communications at the indicated QoS level.

Referring to FIG. 2, the operation of WPS communication device 101 and SIP server system 122 is illustrated. SIP server system 122 transfers a WPS authorization code to WPS communication device 101 (201). This code transfer may be periodic or upon request to maintain fresh authorization codes in WPS communication device 101. The WPS authorization code may be associated with a TTL and/or QoS level. In some examples, WPS communication device 101 requests the WPS authorization codes with a secret user key that is known to SIP server system 122.

WPS communication device 101 transfers a WPS SIP message having the WPS authorization code and a WPS session request to SIP server system 122 (202). The SIP message is usually a SIP INVITE, and the WPS session request is usually a destination phone number. An exemplary number string for the SIP INVITE "TO" field comprises: 1+6-digit authorization code+1+10-digit destination number. In some examples, WPS communication device 101 executes a WPS dialer application that displays contacts and calling buttons. The WPS dialer application generates and transfers the WPS SIP INVITE with the authorization code and the destination number responsive to user activation of a contact or calling button.

SIP server system 122 authorizes the WPS SIP message based on the WPS authorization code (203). SIP server system 122 may check a TTL metric to deny authorization to a stale authorization code. SIP server system 122 may select a QoS level based on the authorization code. SIP server system 122 typically removes the authorization code from the WPS SIP message after authorization.

If the WPS SIP message is authorized (204), then SIP server system 122 identifies network addressing for the WPS session request (205). If the WPS SIP message is not authorized (204), then SIP server system 122 blocks the WPS SIP message (208).

The network address for WPS communication device 101 is known from a prior device registration where WPS communication device 101 transferred its network address to SIP server system 122. The network address for WPS session endpoint 102 may also be known from its device registration. Alternatively, SIP server system 122 may message other SIP systems to obtain the network address for SIP session endpoint 102. SIP server system 122 typically forwards the authorized WPS SIP INVITE with the network address for WPS communication device 101 to WPS session endpoint 102. WPS session endpoint 102 then returns a SIP OK message with its own network address to accept the WPS session.

After WPS SIP message authorization, SIP server system 122 may add a WPS RPH to the WPS SIP message. The RPH could indicate a server QoS level ("ets.0", "ets.1", . . . ) in the emergency namespace. SIP server system 122 may also select a network QoS level based on a user ID. For example, SIP server system 122 may access a Home Subscriber System (HSS) with the International Mobile Subscriber Identifier (IMSI) for WPS communication device 101 to obtain a network QoS level. SIP server system 122 can also indicate the network QoS level ("wps.y", "wps.x", . . . ) in the emergency namespace. Wireless data communication network 100 will exchange WPS data for WPS communication device 101 based on this network QoS level.

SIP server system 122 transfers a response message to WPS communication device 101 that identifies the network addressing (206). The response message is typically the SIP OK message that has the network address for SIP session endpoint 102. WPS communication device 101 and WPS session endpoint 102 then exchange WPS data to using the network addresses (207). For example, WPS communication device 101 and WPS session endpoint 102 may exchange voice data over a WPS phone call.

Figure 3:
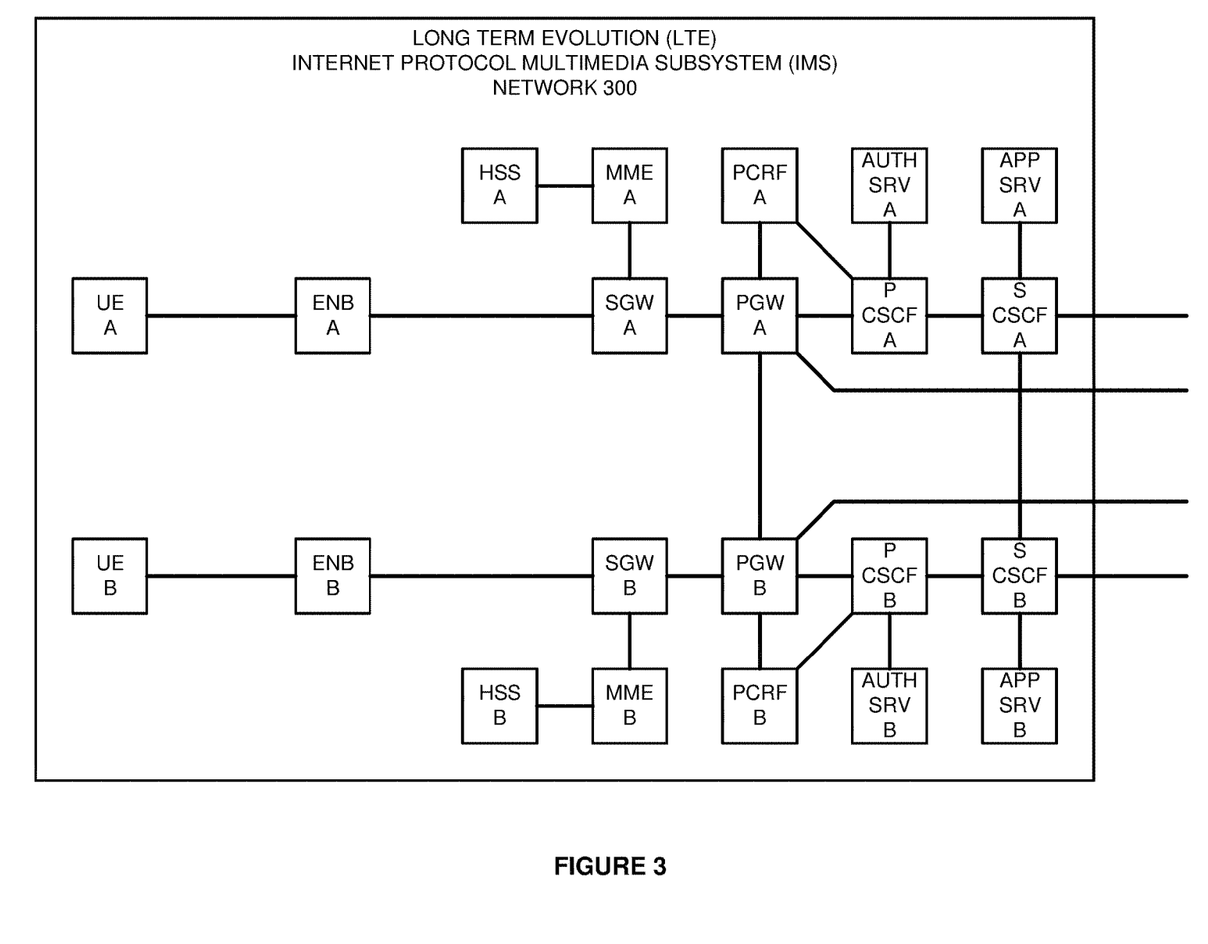
FIGS. 3-6 illustrate a Long-Term Evolution (LTE) Internet Protocol Multimedia Subsystem (IMS) network to serve Wireless Priority Service (WPS) communications using authorization codes.

FIGS. 3-6 illustrate Long Term Evolution (LTE) Internet Protocol Multimedia Subsystem (IMS) network 300 to serve Wireless Priority Service (WPS) communications. Referring to FIG. 3, LTE IMS network 300 comprises two different LTE systems that are denoted by the letters A and B. LTE system A and LTE system B each comprise: User Equipment (UE), evolved Node B (ENB), Serving Gateway (S-GW), Mobility Management Entity (MME), Home Subscriber System (HSS), Packet Data Network Gateway (P-GW), Policy Charging Rules Function (PCRF), Proxy Call State Control Function (P-CSCF), Serving Call State Control Function (S-CSCF), Authorization Server (AUTH SRV), and Application Server (APP SRV).

Some of these LTE network elements could be combined. For example, MME A and MME B could be the same MME. HSS A and HSS B might be the same HSS. The CSCFs, applications servers, and authorization servers could be the same as well. The authorization server and the application server could be integrated. The authorization server and the P-CSCF could be integrated. Other similar combinations are possible.

Figure 4:
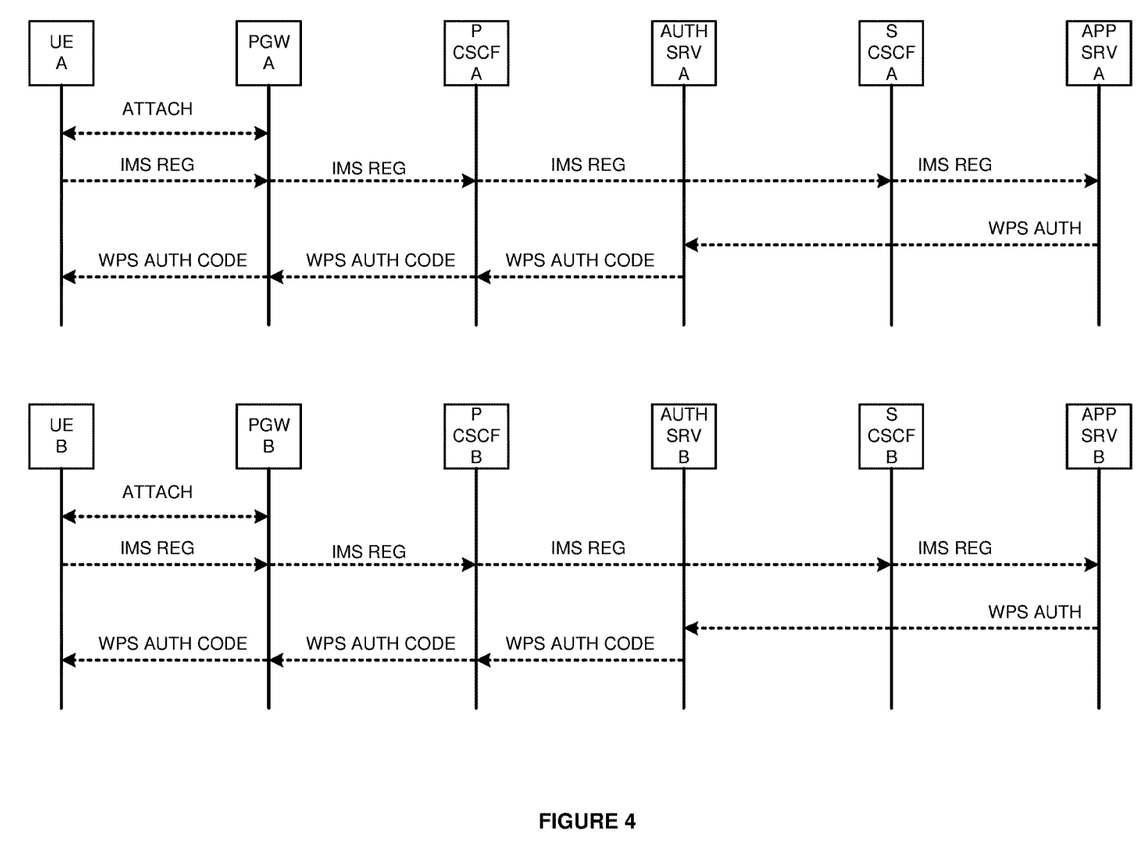

Referring to FIG. 4, the operation of LTE IMS 300 is described. Note that some conventional signaling is omitted for clarity. UE A attaches to PGW A. To attach to PGW A, UE A wirelessly attaches to ENB A using Radio Resource Control (RRC) signaling. ENB A transfers an initial UE message to MME A. MME A dips HSS A with the IMSI for UE A to identify an Internet Protocol Multimedia Subsystem (IMS) Access Point Name (APN). MME A transfers a create session message with the IMS APN for UE A to SGW A. SGW A transfers a corresponding create bearer message with the IMS APN for UE A to PGW A. PGW A dips PCRF A with the IMSI and IMS APN for UE A to obtain a QoS Class Identifier (QCI) 5 for a default IMS bearer. PGW A selects an IP address for UE A and identifiers an IP address for P-CSCF A. PGW A sends a create bearer message for UE A to SGW A that indicates the IMS APN, QCI 5 IMS bearer, UE A IP address, and P-CSCF A IP address. SGW A forwards the create bearer message to MME A. MME A sends a session context message to ENB A that indicates the IMS APN, QCI 5 IMS bearer, UE A IP address, and P-CSCF A IP address. ENB A transfers an RRC message to UE A that indicates the IMS APN, QCI 5 default bearer, UE A IP address, and P-CSCF A IP address.

UE A then sends an IMS registration (REG) message to P-CSCF A over the QCI 5 IMS bearer through PGW A (and SGW A and ENB A). The IMS registration message indicates the IP address of UE A. P-CSCF A forwards the IMS registration message to S-CSCF A, and S-CSCF A sends the IMS registration message to Application Server (APP SRV) A. Application server A dips HSS A to complete the registration. Application server A notifies Authorization (AUTH) server A of the successful registration for UE A. In response, authorization server A sends WPS authorization codes to UE A over the QCI 5 IMS bearer through PGW A (and SGW A and ENB A).

Contemporaneously, UE B attaches to PGW B. To attach to PGW B, UE B wirelessly attaches to ENB B using RRC signaling. ENB B transfers an initial UE message to MME B. MME B dips HSS B with the IMSI for UE B to identify the IMS APN. MME B transfers a create session message with the IMS APN for UE B to SGW B. SGW B transfers a corresponding create bearer message with the IMS APN for UE B to PGW B. PGW B dips PCRF B with the IMSI and IMS APN for UE B to obtain the QCI 5 for the default IMS bearer. PGW B selects an IP address for UE B and identifies an IP address for P-CSCF B. PGW B sends a create bearer message for UE B to SGW B that indicates the IMS APN, QCI 5 IMS bearer, UE B IP address, and P-CSCF B IP address. SGW B forwards the create bearer message to MME B. MME B sends a session context message to ENB B that indicates the IMS APN, QCI 5 IMS bearer, UE B IP address, and P-CSCF B IP address. ENB B transfers an RRC message to UE B that indicates the IMS APN, QCI 5 IMS bearer, UE B IP address, and P-CSCF B IP address.

UE B then sends an IMS registration message to P-CSCF B over the QCI 5 IMS bearer through PGW B (and SGW B and ENB B). The IMS registration message indicates the IP address of UE B. P-CSCF B forwards the IMS registration message to S-CSCF B, and S-CSCF B sends the IMS registration message to application server B. Application server B dips HSS B to complete the registration. Application server B notifies authorization server B of the successful registration for UE B. In response, authorization server B sends WPS authorization codes to UE B over the QCI 5 IMS bearer through PGW B (and SGW B and ENB B).

Figure 5:
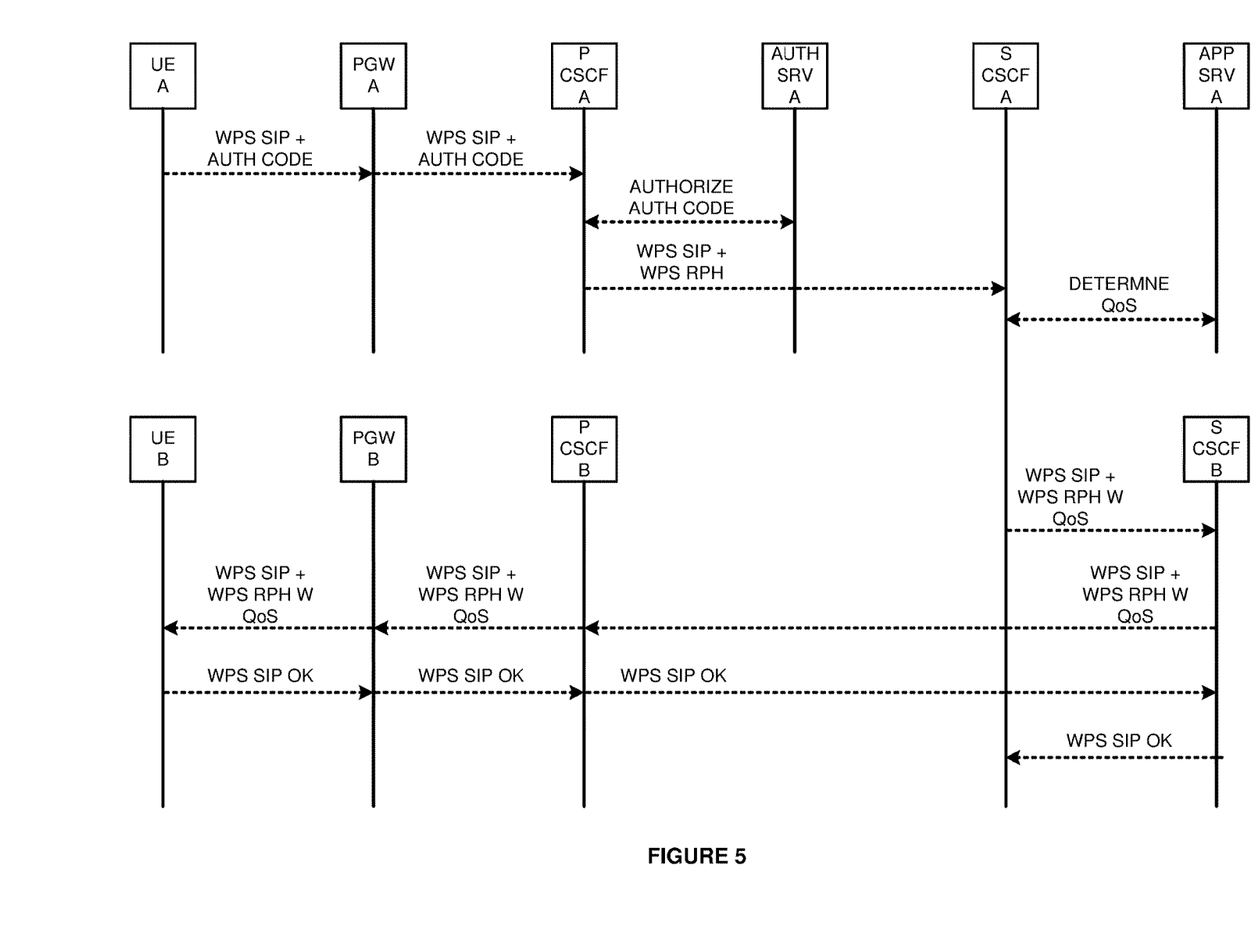

Referring to FIG. 5, UE A transfers a WPS SIP INVITE to P-CSCF A. The WPS SIP INVITE has a WPS authorization code and the destination number of UE B in its "TO" field. P-CSCF A transfers the WPS authorization code from the SIP WPS INVITE to the authorization server. The authorization server matches the WPS authorization code from UE A with its own record of the WPS authorization code for UE A. In response to successful authorization, P-CSCF A removes the authorization code from the "TO" field and adds a Resource Priority Header (RPH) to the WPS SIP INVITE. P-CSCF A notes initial QoS in the emergency telecommunication namespace of the RPH. P-CSCF A transfers the WPS SIP INVITE with the WPS RPH to S-CSCF A. S-CSCF A interacts with application server A to determine a network QoS level. To determine network QoS, S-CSCF A forwards the INVITE to application server A, and application server A dips HSS A with the IMSI for UE A to get a network QoS. The application server notes the network QoS in the emergency telecommunication namespace of the RPH and returns the WPS SIP INVITE with QoS indication to S-CSCF A.

Based on the destination number or instructions from application server A, S-CSCF A transfers the WPS SIP INVITE with the QoS indication to S-CSCF B for delivery to UE B. S-CSCF B transfers the WPS SIP INVITE with the QoS indication to UE B over P-CSCF B and PGW B (and SGW B and ENB B). UE B accepts the WPS session by sending a WPS SIP OK to S-CSCF A for delivery to UE A. The WPS SIP OK traverses ENB B, SGW B, PGW B, P-CSCF B, and S-CSCF B.

Figure 6:
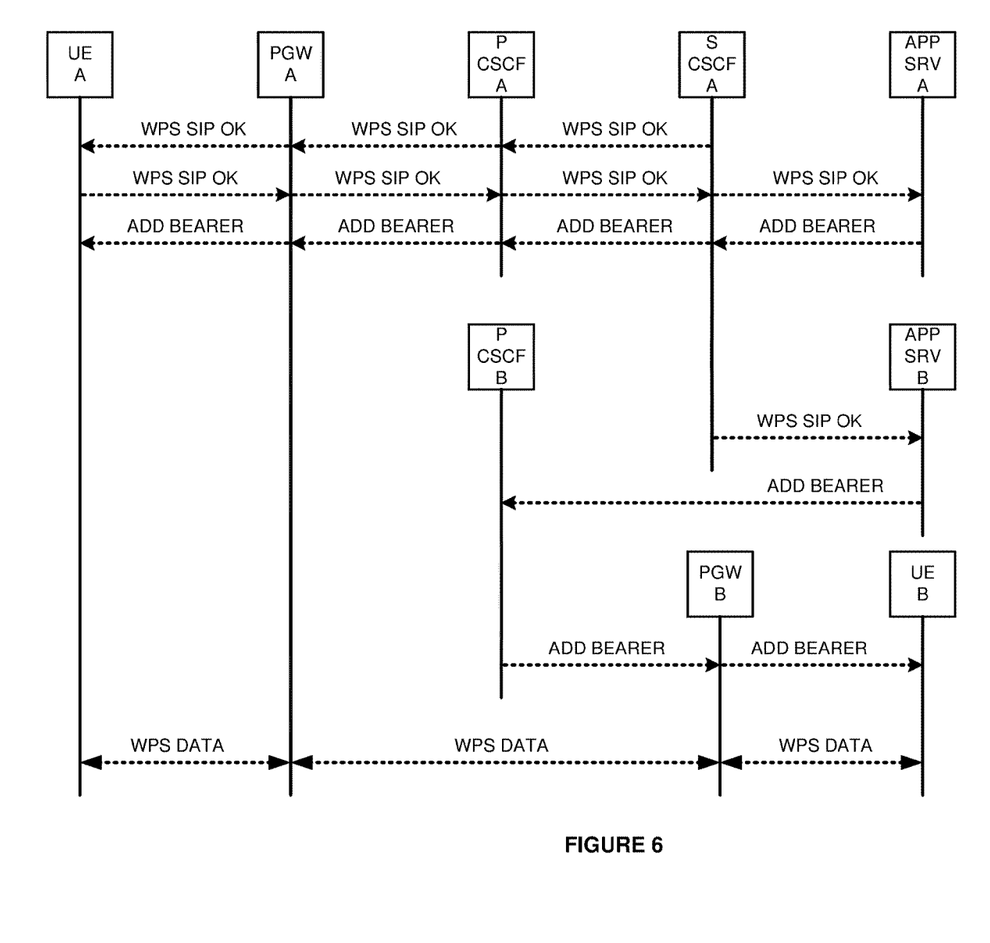

Referring to FIG. 6, S-CSCF A transfers the WPS SIP OK to UE A over P-CSCF A and PGW A (and SGW A and ENB A). UE A accepts the WPS session by sending a WPS SIP OK to application server A. The WPS SIP OK traverses ENB A, SGW A, PGW A, P-CSCF A, and S-CSCF A. Application server A directs PGW A to add a WPS media bearer with messaging that traverses S-CSCF A, P-CSCF A and PCRF A. PGW A notifies UE A of the WPS media bearer over SGW A and ENB A. Contemporaneously, S-CSCF A transfers a WPS SIP OK to application server B through S-CSCF B. Application server B directs PGW B to add a WPS media bearer with messaging that traverses S-CSCF B, P-CSCF B and PCRF B. PGW B notifies UE B of the WPS media bearer over SGW B and ENB B.

UE A and UE B then exchange WPS data like voice, video, or messaging over PGW A and PGW B (and ENB A, ENB B, SGW A, and SGW B).

Figure 7:
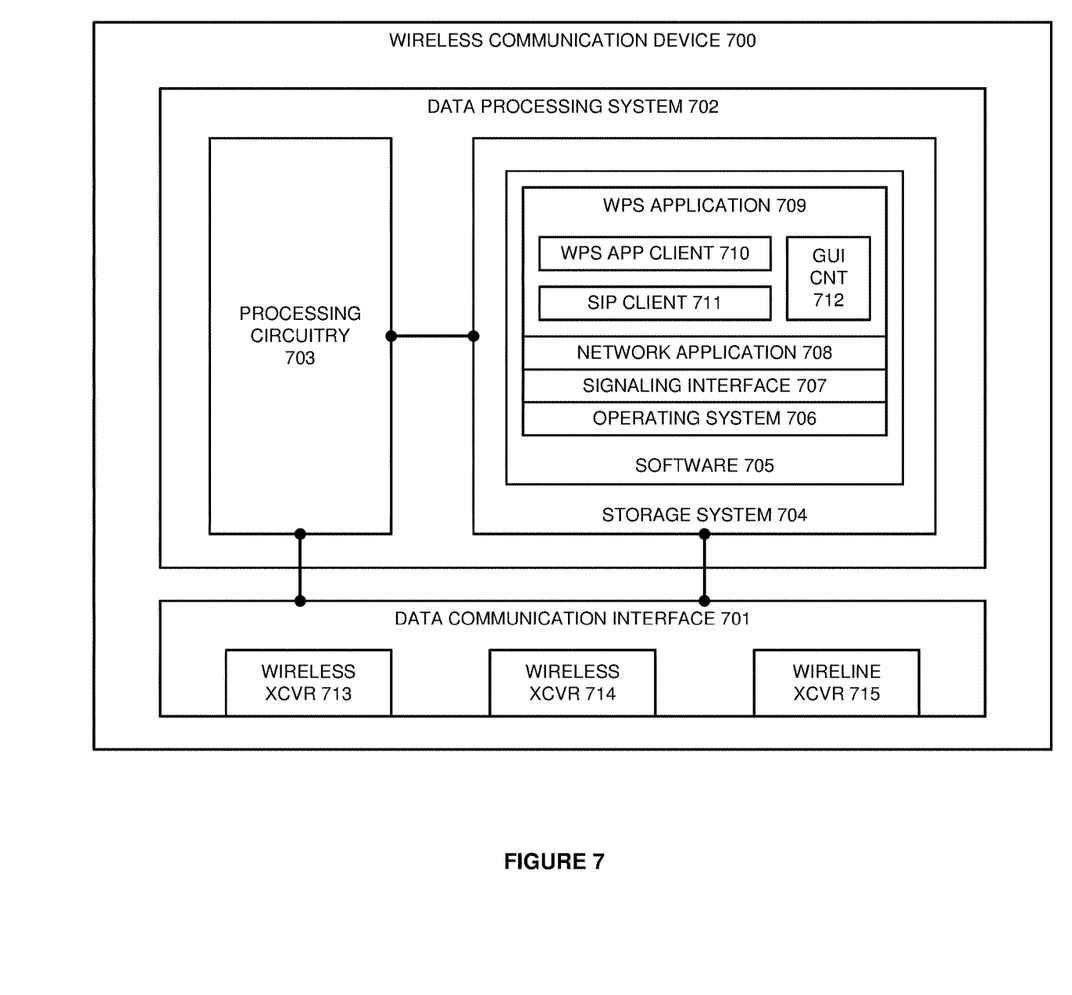
FIG. 7 illustrates wireless communication device to serve Wireless Priority Service (WPS) communications using authorization codes.

FIG. 7 illustrates wireless communication device 700 to serve Wireless Priority Service (WPS) communications. Wireless communication device 700 is an example of WPS communication device 101 although device 101 may use alternative configurations and operations. Wireless communication device 700 comprises data communication interface 701 and data processing system 702. Data communication interface 701 comprises transceivers 713-715. Data processing system 702 comprises processing circuitry 703 and storage system 704. Storage system 704 stores software 705. Software 705 includes respective software modules 706-712.

Transceivers 713-715 comprise communication components, such as ports, bus interfaces, signal processors, memory, software, and the like. Wireless transceivers 713-714 comprise wireless communication components, such as antennas, amplifiers, filters, and modulators. Processing circuitry 703 comprises central processing units, circuit boards, bus interfaces, integrated circuitry, and associated electronics. Storage system 704 comprises non-transitory, machine-readable, data storage media, such as flash drives, disc drives, memory circuitry, servers, and the like. Software 705 comprises machine-readable instructions that control the operation of processing circuitry 703 when executed.

Wireless communication device 700 may be centralized or distributed. All or portions of software 706-712 may be externally stored on one or more storage media, such as circuitry, discs, and the like. Some conventional aspects of wireless communication device 700 are omitted for clarity, such as power supplies, enclosures, and the like. When executed by processing circuitry 703, software modules 706-712 direct circuitry 703 to perform the following operations.

Operating system 706 interfaces between software modules 707-712 and the device 700 hardware (data communication interface 701, processing circuitry 703, RAM, storage system 704). Signaling interface modules 707 direct network control communications for modules 708-709. Network application modules 708 perform client tasks for data communication services. WPS application modules 709 comprises WPS application client 710, SIP client 711, and Graphic User Interface (GUI) controller (CNT) 712. WPS application client 710 interacts with WPS application servers to obtain WPS services. SIP client 711 handles SIP signaling including the insertion of authorization codes in the INVITE TO fields. GUI controller 712 drives a touch display to display contact and session activation buttons to initiate WPS communications.

Figure 8:
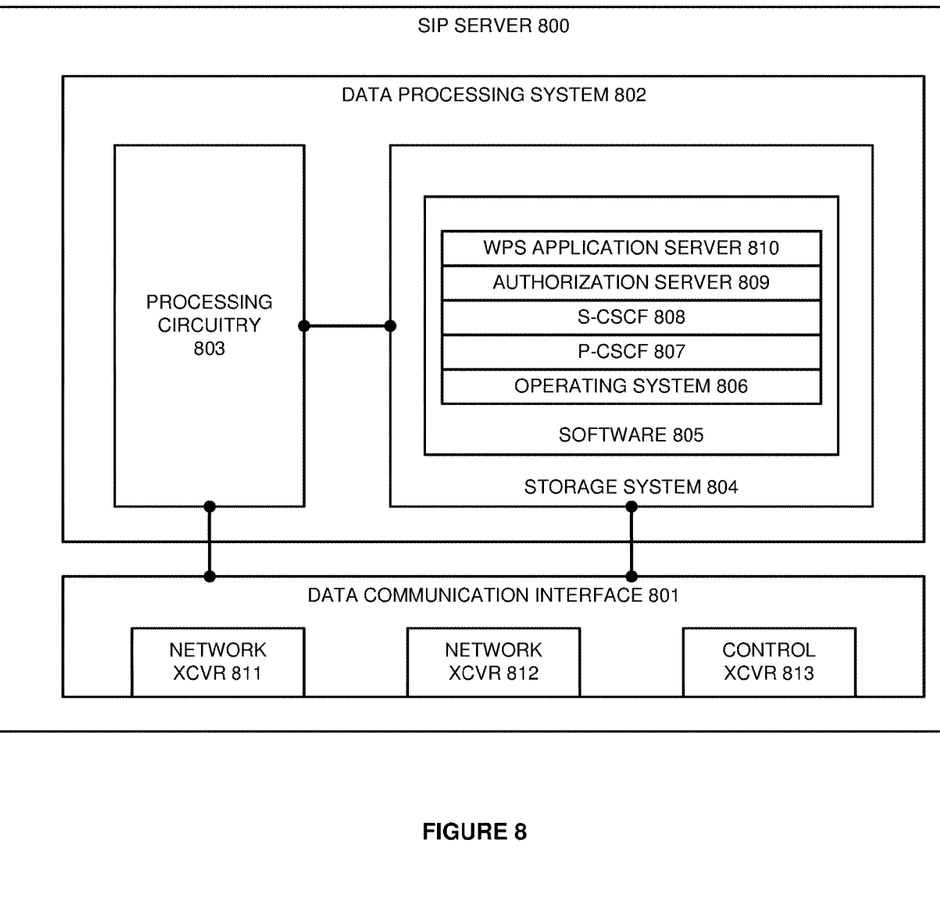
FIG. 8 illustrates a Session Initiation Protocol (SIP) server to serve Wireless Priority Service (WPS) communications using authorization codes.

FIG. 8 illustrates a Session Initiation Protocol (SIP) server 800 to serve Wireless Priority Service (WPS) communications. SIP server 800 is an example of SIP server system 122, although server system 122 may use alternative configurations and operations. SIP server 800 comprises data communication interface 801 and data processing system 802. Data communication interface 801 comprises transceivers 811-813. Data processing system 802 comprises processing circuitry 803 and storage system 804. Storage system 804 stores software 805. Software 805 includes respective software modules 806-809.

Transceivers 811-813 comprise communication components, such as ports, bus interfaces, signal processors, memory, software, and the like. Network transceivers 811-812 exchange SIP signaling and Diameter signaling. Control transceiver 813 exchanges control data with a master application controller or user interface.

Processing circuitry 803 comprises central processing units, circuit boards, bus interfaces, integrated circuitry, and associated electronics. Storage system 804 comprises non-transitory, machine-readable, data storage media, such as flash drives, disc drives, memory circuitry, servers, and the like. Software 805 comprises machine-readable instructions that control the operation of processing circuitry 803 when executed.

SIP server 800 may be centralized or distributed. All or portions of software 806-810 may be externally stored on one or more storage media, such as circuitry, discs, and the like. Some conventional aspects of SIP server 800 are omitted for clarity, such as power supplies, enclosures, and the like. When executed by processing circuitry 803, software modules 806-810 direct circuitry 803 to perform the following operations.

Operating system 806 interfaces between software modules 807-810 and server 800 hardware (data communication interface 801, processing circuitry 803, RAM, storage system 804). P-CSCF modules 807 provide border control and SIP routing tasks. P-CSCF modules 807 interact with authorization server modules 810 to authorize WPS authorization codes. S-CSCF modules 808 interface with other CSCFs and WPS application server modules 810. Authorization server 809 generates and transfers authorization codes to UEs and then authorizes these codes when they are properly used by the UEs for WPS communications. WPS application server modules 810 authorizes users, selects network QoS, and manages WPS services.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless data communication network to serve Wireless Priority Service (WPS) communications, the method comprising:
   a Proxy Call State Control Function (P-CSCF) Session Initiation Protocol (SIP) server system transferring a WPS authorization code;
   a WPS communication device wirelessly receiving the WPS authorization code;
   the WPS communication device wirelessly transferring a WPS SIP message having the WPS authorization code and a WPS session request;
   the P-CSCF SIP server system receiving the WPS SIP message and authorizing the WPS SIP message based on the WPS authorization code, and when the WPS SIP message is authorized, the P-CSCF SIP server system identifying network addressing based on the WPS session request and transferring a response message that identifies the network addressing; and
   the WPS communication device wirelessly receiving the response message and wirelessly transferring WPS data over the WPS session using the network addressing.

2. The method of claim 1 further comprising the P-CSCF SIP server system authorizing the WPS SIP message based on a Time-To-Live (TTL) for the authorization code.

3. The method of claim 1 further comprising the P-CSCF SIP server system adding a WPS Resource Priority Header (RPH) to the WPS SIP message when the WPS SIP message is authorized.

4. The method of claim 1 further comprising the P-CSCF SIP server system adding a Quality-of-Service (QoS) level to the WPS SIP message based on the authorization code.

5. The method of claim 1 further comprising the P-CSCF SIP server system adding a Quality-of-Service (QoS) level to the WPS SIP message based on an identifier for the wireless communication device.

6. The method of claim 1 wherein the WPS SIP message does not contain a *272 dialing prefix.

7. The method of claim 1 wherein the WPS session comprises voice conferencing.

8. The method of claim 1 wherein the WPS session comprises video conferencing.

9. The method of claim 1 wherein the WPS session comprises data messaging.

10. A wireless data communication network to serve Wireless Priority Service (WPS) communications comprising:
   a Proxy Call State Control Function (P-CSCF) Session Initiation Protocol (SIP) server system configured to transfer a WPS authorization code;
   a WPS communication device configured to wirelessly receive the WPS authorization code and wirelessly transfer a WPS SIP message having the WPS authorization code and a WPS session request;
   the P-CSCF SIP server system configured to receive the WPS SIP message and authorize the WPS SIP message based on the WPS authorization code, and when the WPS SIP message is authorized, the P-CSCF SIP server system is configured to identify network addressing based on the WPS session request and transfer a response message that identifies the network addressing; and
   the WPS communication device configured to wirelessly receive the response message and wirelessly transfer WPS data over the WPS session using the network addressing.

11. The wireless data communication network of claim 10 wherein the P-CSCF SIP server system is further configured to authorize the WPS SIP message based on a Time-To-Live (TTL) for the authorization code.

12. The wireless data communication network of claim 10 wherein the P-CSCF SIP server system is further configured to add a WPS Resource Priority Header (RPH) to the WPS SIP message when the WPS SIP message is authorized.

13. The wireless data communication network of claim 10 wherein the P-CSCF SIP server system is further configured to add a Quality-of-Service (QoS) level to the WPS SIP message based on the authorization code.

14. The wireless data communication network of claim 10 wherein the P-CSCF SIP server system is further configured to add a Quality-of-Service (QoS) level to the WPS SIP message based on an identifier for the wireless communication device.

15. The wireless data communication network of claim 10 wherein the WPS SIP message does not contain a *272 dialing prefix.

16. The wireless data communication network of claim 10 wherein the WPS session comprises voice conferencing.

17. The wireless data communication network of claim 10 wherein the WPS session comprises video conferencing.

18. The wireless data communication network of claim 10 wherein the WPS session comprises data messaging.

* * * * *